Dec. 3, 1935. J. VEHKO 2,022,795
METHOD OF BRAZING JOINTS AND THE LIKE
Filed Oct. 22, 1931
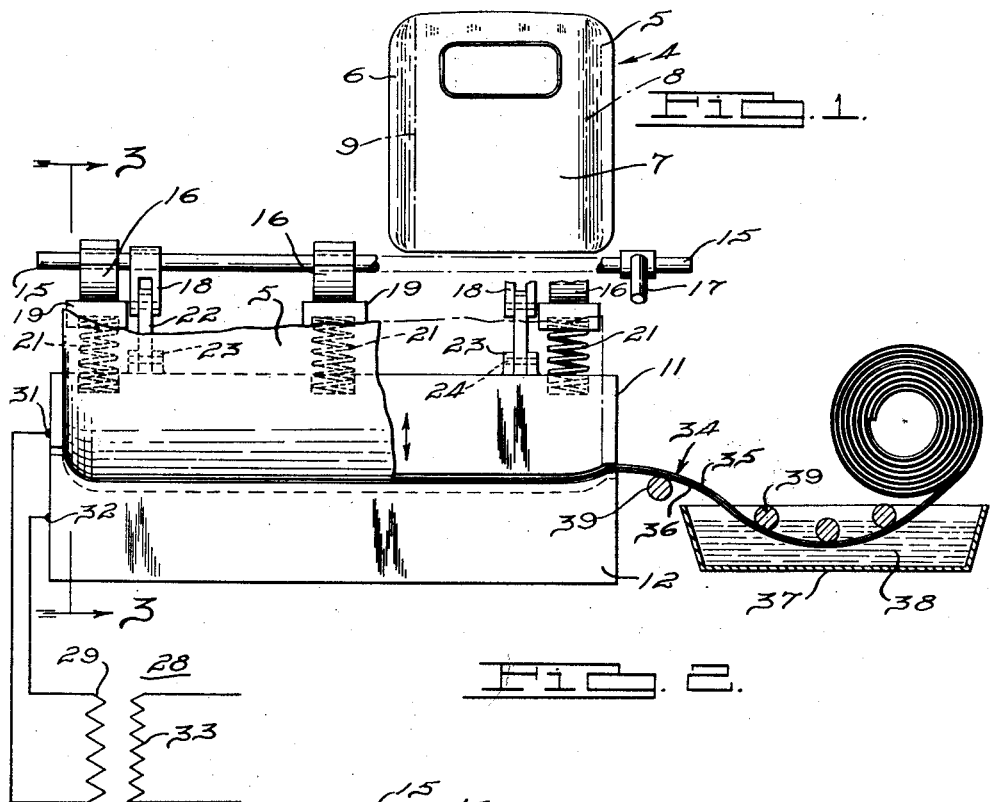
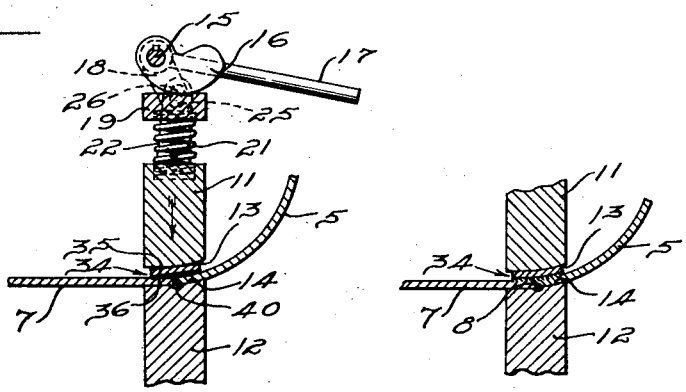
INVENTOR
James Vehko.
BY
Harness, Dickey, Pierce & Hann
ATTORNEYS.

Patented Dec. 3, 1935

2,022,795

UNITED STATES PATENT OFFICE 2,022,795

METHOD OF BRAZING JOINTS AND THE LIKE

James Vehko, Detroit, Mich., assignor to The Murray Corporation of America, a corporation of Delaware Application October 22, 1931, Serial No. 570,399

8 Claims. (Cl. 219—12)

My invention relates to method and means for securing metal members together and particularly to the method employed for joining two metal sheets of predetermined contour together in such manner as to have the sheets in exact alignment with the abutting edges thereof filled with a spelter material for adding strength to the joint and for providing an outer surface to the jointed edges which is continuous and of exact curvature.

It has been the practice in the past, when joining sheets of material in an attempt to provide a smooth outer surface, a employ a butt welding process which was effected in a large and expensive machine which received the sheets between spaced clamping elements and electrodes and which were movable to have the sheets move into abutting relation. In spite of the accuracy employed in building these machines and the care exercised when effecting its operation, a large number of the sheets thus welded, were scrapped because of the imperfect product formed in the machine by the butt welding operation.

It is readily apparent, that when employing a thin gauge material, a very slight disalignment of the sheets, which were of predetermined curved form, cause the joint or a portion thereof to be so badly out of alignment that a dressing and padding operation could not be performed to provide a smooth surface and at the same time retain the strength of the welding articles. When the butt welded joint was not too badly out of alignment, the material offset outwardly at the joint was ground down a certain amount and solder or a similar substance was applied to the lower surface to build it up even with the dressed surface on the adjacent sheet. Such operation was expensive, requiring time and labor, and provided a joint which was very unsatisfactory both as to appearance and lack of strength.

In practicing my invention I utilize a method and means for securing sheets of metal together in the nature of body paneling for automotive vehicles, which retain the sheets in exact predetermined alignment with the joint therebetween entirely filled with a joining or spelter material to, provide an outer surface which is smooth and of predetermined contour. I employ a pair of dies or clamping members in the nature of electrodes, having complementary faces of predetermined curvature, conforming to that of the finished product, between which the sheets of metal are disposed in aligned abutting relation.

A reinforcing strip is placed across the joint, having a spelter material associated therewith, all of which are clamped in firm relation to each other between the electrodes. A current of predetermined intensity is then applied to the electrodes and retained for a period of time, sufficient only to melt the spelter material after which the current is shut off and the spelter material becomes set to form a solid joint with the surface of the sheet which are in exact aligned position at all parts of the joint. The joining strip having the spelter material secured thereto has been described and claimed in my co-pending application Serial No. 570,398, filed December 22, 1931, and assigned to the assignee of the present invention.

The main objects of my invention are to provide a method and means for securing two sheet metal panel members together in such manner as to provide a smooth outer surface thereto while retaining the predetermined curvature of the finished product; to provide electrodes having complementary faces of predetermined curvature conforming to that of the curvature of the finished product; to provide clamping means for drawing the two electrodes toward each other for clamping the elements in fixed predetermined relation and for further urging the members together after the spelter material has been melted; to provide an electric current of predetermined intensity for melting the spelter material without marring the metal elements; to provide a flux through which the spelter strip may be drawn for effecting the proper bonding of the elements; to provide a recess in the face of one of the dies, with which the joint is aligned, to permit the flow of spelter material through the crack formed at the abutted edges of the metal members; and, in general, to provide a method and means for securing paneling of predetermined contour in abutted relation to each other so as to have a smooth continuous outer surface which is effected by the exact alignment of the panel sheets.

Other objects and features of novelty of my invention will be either specifically pointed out or will become apparent when referring, for a better understanding of my invention, to the following description in conjunction with the accompanying drawing, wherein:

Figure 1 is a rear reduced view of an automotive vehicle body, illustrating the lines along which the various panel elements may be secured together by the method and means embodying my invention, Fig. 2 is a diagrammatical view of the means which I utilize when effecting the joinder of the metal panels by my method.

Fig. 3 is a sectional view of the structure illustrated in Fig. 2, taken on the line 3—3 thereof, showing the elements in assembled relation, and Fig. 4 is a broken view of the structure illustrated in Fig. 3, with the clamping electrodes moved into clamped relation with the elements.

In Fig. 1, I have illustrated an automotive vehicle body having side panels 5 and 6 and a rear panel 7 which are secured together along seams 8 and 9. The seam is to be formed in such manner as to provide a smooth outer surface to the body so that after painting the seam will be entirely invisible. As pointed out hereinabove, the seams were formed heretofore by a butt welding process which, while effecting a satisfactory joint when the panel elements were properly aligned, resulted in the scrapping of a large number of the elements or the requirement of an expensive operation thereon when improperly aligned which was of frequent occurrence.

My present method pertains to the formation of the seams 8 and 9 by a brazing process in which the panel elements are retained in exact aligned position which assures the presence of a smooth outer surface at each seam. In Fig. 2, I have illustrated diagrammatically a structure which may be utilized for effecting the brazing operation, that of providing a pair of electrodes 11 and 12 having complementary faces 13 and 14 of a contour both laterally and vertically conforming to the curvature of the finished body panel at the seam. The electrodes thus formed are in the nature of dies which may be pressed firmly together when the panel elements and bridging strip is placed therebetween for securing the elements in predetermined relation to each other.

Any suitable means such as a hydraulic ram, a compressed air actuated mechanism, a motor mechanism or other well known means may be utilized for forcing the two elements into predetermined relation to each other. I have illustrated a manually actuated device for effecting the relative movement of the dies which is shown herein for the purpose of illustration. A shaft 15 is mounted in suitable bearings (not shown) and has secured thereto for rotation therewith, cam elements 16, an operating handle 17 and arms 18, all of which revolve with the shaft 15 when actuated by the handle 17.

The cams 16 rest upon blocks 19 which are mounted on springs 21 secured to the top portion of the die 11. Links 22 are pivotally secured to the bosses 23 of the die 11 by pins 24 and are pivotally connected to the arms 18 by pins 25 operating in slots 26 in the arms.

In this construction, when the handle 17 is moved upwardly or, in other words, rotated in a counter-clockwise direction the arms 18 engage the links 22 to raise the die or electrode 11 out of engagement with the brazed elements and the die or electrode 12. When the handle is moved in a clockwise direction the die 11 is released by the lowering of the arms 18 and the links 22 and the cams 16, moving across the face of the blocks 19, forces the die 11 downwardly against the elements to be welded. The purpose of the springs is to provide an additional bias to the die 11, enabling it to move downwardly after the spelter material has been melted to force the members into firm clamped relation as will be described more fully hereinafter.

A current is conducted to the dies or electrodes 11 and 12 by a transformer 28, the secondary circuit 29 of which is bridged across the electrodes 11 and 12, being connected thereto at 31 and 32. The primary circuit 33 of the transformer 28 is connected to a suitable source of supply, (not shown) to be controlled by a switch in a well known manner.

The brazing strip 34, which as pointed out above was described and claimed in my above mentioned co-pending application, is provided with a bridging strip 35, as illustrated in Figs. 2 and 3, and a strip of spelter material 36 which are retained in unit relation in a predetermined manner as specified in the above mentioned co-pending application. The strip 34 is preferably provided in a roll or on a spool and is preferably supported for rotation to permit the strip to be drawn therefrom when required.

In Fig. 2, I have illustrated a reservoir 37 containing a flux 38 which may be powdered borax or the like but which preferably is a liquid such as boracic acid or other well known flux suitable to be employed during the brazing operation. A plurality of rollers 39 are associated with the reservoir for guiding the strip so as to effect its immersion in the flux. The flux, as is well known, prevents the oxidation during the brazing operation and aids in dissolving the oxide formed prior thereto to thereby provide clean surfaces for effecting a strong bond between the metal elements. As pointed out in my above mentioned co-pending application, the flux may be disposed relative to the elements of the strip and form a unit part thereof in which case the reservoir and rollers may be disposed with.

When the handle 17 is moved in a counter-clockwise direction and after a welding operation has been completed and the welded article removed from the machine, a new set of panel elements 5, 6 and 7 are disposed in the machine with the seams 8 and 9 to be formed thereon disposed substantially central of the dies or electrodes 11 and 12. It is to be understood that I preferably employ a machine having two separate sets of dies 11 and 12 so that both of the seams 8 and 9 may be formed at the same time.

As illustrated in Figs. 3 and 4, an elongated slot 40 is provided centrally of the die 12 running substantially the full length of the die to provide a recess below the space between the abutted ends of the elements 5, 6 and 7. The strip 34 is then drawn forwardly to extend across the sheets 5, 6 and 7 and disposed below the die 11 in a position to span the seams 8 and 9. The operating means is then actuated to force the two dies 11 downwardly upon the elements which, as herein shown, would be effected by the clockwise movement of the handle 15 to press the elements into firm relation to each other, in which position the sheets 5, 6 and 7 will be retained in exact alignment in proper curved relation to each other.

The current is then supplied, by the operation of suitable switching equipment (not shown), to the primary circuit 31 of the transformer 28 which transforms the energy to provide a current of proper predetermined intensity in the secondary circuit 29 which is conductively joined to the electrodes 11 and 12. The current flowing through the materials 5, 6, 7 and 34 causes the material to be heated, owing to the resistance offered thereby to the flow of current. When the temperature is raised a predetermined amount the spelter material 36 is melted and the current is shut off.

The metal strip 35 is forced into more intimate relation to the elements 5, 6 and 7, as illustrated in Fig. 4, by the bias effected by the springs 21, or by the hydraulic or pneumatically operated ram or similar structure which may be employed for effecting the additional movement of the electrode 11. During this operation a portion of the spelter material 36 is squeezed out from between the strip 35 and the paneling 5, 6 and 7 and is forced into the seams 8 and 9 between the abutting edges of the paneling 5, 6 and 7, the flow of which is encouraged by the longitudinally extending recesses 40, across which the seams are disposed.

Any excess material will flow from the edges of the strip 35 and as soon as the elements have cooled a predetermined amount the spelter material will harden and retain the elements in secured relation to each other with the outer surface of the paneling elements forming an extreme smooth contour, except for the bead formed by the excess spelter material which flowed outwardly of the seams into the recesses 40. A very inexpensive operation is employed for removing this beading and a very durable joint is, in this manner, formed which is of constant predetermined strength and of exact uniform contour on all of the body panelings.

It is to be understood, that the method and means which I employ for joining sheet members together, is not limited to the automotive vehicle body art but may be employed to advantage in other arts, particularly where sheet metal elements, having predetermined curvature, are to be joined to each other, and that separate strips of bridging and spelter material may be employed in place of the unit strip described in my above mentioned application.

While I have described and illustrated but a single embodiment of my invention, it will be apparent to those skilled in the art that various changes, omissions, additions, and substitutions may be made therein without departing from the spirit and scope of my invention, as set forth in the accompanying claims.

I claim:

1. The method of joining metal sheets of predetermined curved form in abutting relation to each other which includes the steps, of mounting the sheets in abutting relation to each other between dies having complementary faces of predetermined curvature, of mounting a strip of bridging and spelter materials over said abutted edges and under one of said dies, of drawing said dies toward each other for securing the elements in predetermined curved clamped relation throughout the length to be joined, and of providing heat to said elements for melting said spelter material.

2. The method of joining metal sheets of predetermined curved form in abutting relation to each other which includes the steps, of mounting the sheets in abutting relation to each other between dies having complementary faces of predetermined curvature, of mounting a strip of bridging and spelter material over said abutted edges and under one of said dies, of drawing said dies toward each other for securing the elements in predetermined curved clamped relation, of providing heat to said elements for melting said spelter material throughout the length to be joined, and of further moving said dies for forcing the sheet and bridging strips in closer relation after the melting of the spelter material.

3. The method of joining metal sheets in abutting relation to each other which includes the steps, of mounting a metal strip over the seam of said sheets when mounted in abutted relation, of mounting a strip of spelter material between the metal strip and the sheets, of forcing the sheets and strips into predetermined relation to each other throughout the length of the sheets, of heating said spelter material, and of forcing said spelter material through the seam between said abutted sheets by moving the bridging strip into intimate relation to the sheets.

4. The method of joining metal sheets of predetermined curvature in abutting relation to each other which includes the steps, of mounting a bridging strip across the edges of the abutted sheets, of securing a layer of spelter material between the strip and sheets, of securing a flux to said spelter material, of clamping said elements in firm relation to each other at all points throughout the curved length of the sheets, of heating said elements for melting said spelter material, and of thereafter forcing the strip into more intimate relation to the sheets, and some of the spelter material into the crack between their abutted edges.

5. The method of joining curved metal sheets of predetermined contour in abutting relation to each other which includes the steps, of drawing a bridging strip having a layer of spelter material associated therewith, through a flux bath, of disposing said strip relative to the abutting edges of the sheets, of forcing a pair of dies having complementary curved faces toward each other for clamping the strip and sheets in predetermined relation to each other following the curve of said sheets, and of heating said spelter material for bonding the bridging member across the abutting edges of the sheets which are retained in exact predetermined alignment with each other throughout the length of their curved surfaces.

6. The method of joining curved metal sheets of predetermined contour in abutting relation to each other which includes the steps, of drawing a bridging strip having a layer of spelter material associated therewith, through a flux bath, of disposing said strip relative to the abutting edges of the sheets, of moving a pair of dies having complementary faces toward each other for clamping the strip and sheets in predetermined relation to each other following the curved contour of said sheets, of heating said spelter material for bonding the bridging member across the abutting edges of the sheets which are retained in exact predetermined alignment with each other, and of further advancing said dies toward each other after the spelter material has been melted for forcing the bridging member into more intimate relation to the sheets and the material into the space between the abutting edges.

7. The method of joining curved metal sheets in abutting relation to each other which includes the steps, of mounting the sheets in abutting relation between receiving members which are movable toward each other and having complementary faces of predetermined contour conforming respectively to the outside and inside curvature of said sheets, of disposing across the abutting edges of said sheets a bi-metallic strip formed of a layer of retaining material and of spelter material in which a flux is embedded, of drawing said receiving members together for clamping the strip and sheets into firm predetermined relation to each other throughout their length at all points of their contour, and of providing heat to said elements for melting said spelter material for forming the bond between the retaining layer and the edges of the sheets.

8. The method of joining metal sheets in abutting relation to each other which includes the steps, of mounting two sheets in abutting relation on a die element of predetermined curvature, of mounting a bridging strip across the edges of the abutted sheets, of disposing a spelter strip between the bridging strip and sheets, of clamping the strips and sheets together by a second die element of complementary shape relative to the first die element, of providing heat to melt said spelter strip and of moving the clamping elements thereafter for forcing the bridging strip into more intimate relation to said sheets.

JAMES VEHKO.

CERTIFICATE OF CORRECTION.

Patent No. 2,022,795.                                  December 3, 1935.

JAMES VEHKO.

It is hereby certified that error appears in the printed specification of the above numbered patent requiring correction as follows: Page 3, second column, line 11, claim 4, for "securing" read applying; and that the said Letters Patent should be read with this correction therein that the same may conform to the record of the case in the Patent Office.

Signed and sealed this 21st day of January, A. D. 1936.

Leslie Frazer (Seal)                                       Acting Commissioner of Patents.